United States Patent [19]

Korth et al.

[11] 4,310,247

[45] Jan. 12, 1982

[54] METHOD AND APPARATUS FOR ANALYZING THE STATE OF POLARIZATION OF RADIATION

[75] Inventors: Hans-Erdmann Korth, Stuttgart; Franz Schedewie, Boeblingen, both of Fed. Rep. of Germany

[73] Assignee: International Business Machines Corporation, Armonk, N.Y.

[21] Appl. No.: 123,160

[22] Filed: Feb. 21, 1980

[30] Foreign Application Priority Data

Apr. 21, 1979 [DE] Fed. Rep. of Germany ....... 2916202

[51] Int. Cl.³ .............................................. G01B 9/02
[52] U.S. Cl. .................................... 356/365; 356/351
[58] Field of Search ............... 356/351, 353, 364, 365, 356/366, 367

[56] References Cited

U.S. PATENT DOCUMENTS 3,694,088  9/1972  Gallagher et al. ................... 356/351
3,700,334  10/1972  Low et al. ............................ 356/351
4,166,954  9/1979  Goranson ............................ 356/353

OTHER PUBLICATIONS

Francon et al., *Polarization Interferometers*, John Wiley & Sons, 1971 pp. 45-46, 50-51, 127-129.

Born et al., *Principles of Optics*, Pergamon Press, 1959, pp. 301-302.

*Primary Examiner*—R. A. Rosenberger
*Attorney, Agent, or Firm*—John J. Goodwin

[57] ABSTRACT

A radiation analyzing system including a beam splitting prism, an analyzer and a photodiode array arranged in an evaluation plane. Upon passing through the prism radiation to be analyzed is split into two beams vertically linearly polarized to each other which include a small angle and show a phase shift that is a function of the distance from the optical axis. The difference of the phase positions of these two beams is a function of their distance from the left or right edge of the prism. The analyzer, which is arranged behind the prism and whose axis of polarization is inclined relative to the directions of polarization of the two vertically polarized beams, produces a periodic intensity distribution when the impinging radiation is polarized at least partly and has a component in parallel to the axis of the analyzer. The periodicity of the intensity distribution which generally consists of an interference fringe pattern in evaluation plane is proportional to the wave length of the light and inversely proportional to the sine of the splitting angle of the prism. This intensity distribution is detected by the one-dimensional photodiode array arranged in the evaluation plane, and subsequently applied either to suitable analog circuits or to a computer for evaluation.

1 Claim, 3 Drawing Figures

METHOD AND APPARATUS FOR ANALYZING THE STATE OF POLARIZATION OF RADIATION

Technical Field

The present invention relates to a method and structure for analyzing the state of polarization and the direction of polarization of radiation. It is applicable with particular advantage for measuring the thickness of thin layers.

In many fields of science and technology, polarization-optical methods and devices are used which have to effect the determination of the state of polarization, i.e. of ellipticity, and the direction of polarization of radiation with a maximum of precision.

Background Art

A conventional prior art method described for instance in "Optik und Atomphysik" by R. W. Pohl, Springer, 1976, pp. 121 and 122, the radiation to be analyzed is applied to rotating analyzer, and the intensity of the passed radiation is measured with a light detector and a voltmeter and recorded as the function of the respective rotational position of the analyzer.

Apart from the fact that this method is very complex and time-consuming, the maximum and minimum of the intensity passed by an analyzer is relatively flat and consequently can be determined only with a precision insufficient for most cases. Therefore it has been also suggested to use analyzers which have a high rotation rate and are connected to angle encoders, and to apply the electric output signal of the following light detector, jointly with the electric signals appearing at the outputs of the angle encoders, to a computer for the calculation of the Fourier coefficients. For increasing the precision it was found to be of advantage to carry out this process for a plurality of rotations of the analyzer and to form a mean value of the results obtained.

Apart from the high technical complexity and the failure and error susceptibility caused by the high speed rotating elements, these devices have the added disadvantage that e.g. an ellipsometric layer thickness measuring takes so much time in spite of high speed rotation analyzers and the use of modern computers that a measuring of objects that are dynamically stressed or exposed to vibrations is not possible. The same applies to the device described in German Offenlegungsschrift No. 26 16 141 where instead of a rotating analyzer a rotating compensator, i.e. a rotating λ/4 wafer is provided.

In the device of the literature reference by R. M. A. Azzam, "Simulation of Mechanical Rotation by Optical Rotation: Application to the Design of a New Fourier Photopolarimeter" J. Opt. Soc. Am., Vol. 68, No. 4, April 1978, pp. 518 to 521, the rotating analyzers or compensators used in the hitherto known ellipsometers are replaced by electrooptical or magnetooptical means for rotating the plane of polarization. Apart from the complicated structure and the logically following error susceptibility of these devices, and the complex and time-consuming mathematical evaluation of the results, such devices also have the disadvantage that owing to the errors connected with each electrooptical or magnetooptical rotator their resolution is worse than the resolution of ellipsometers with rotating elements.

Another example of a radiation analyzer is provided in U.S. Pat. No. 3,880,524, AUTOMATIC ELLIPSOMETER issued Apr. 29, 1975 to Dill et al. and assigned to the present assignee.

SUMMARY OF THE INVENTION

It is the object of the invention to provide a method of analyzing the state of polarization, i.e. of the ellipticity and the direction of polarization of a radiation, by means of which without moving elements, with a low amount of technical complexity, with a minimum of space requirements and with time requirements in the microsecond range the direction and/or the ellipticity of a radiation can be determined with a precision which hitherto even with much more comprehensive and in particular more expensive devices could not be reached. This object is achieved by the invention described relative to FIGS. 1, 2 and 3.

DISCLOSURE OF THE INVENTION

Figure 1:
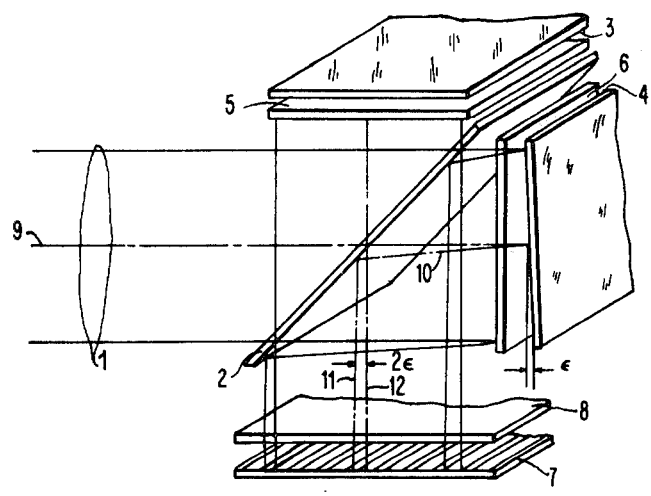
FIG. 1 is a schematic illustration of an embodiment of a device for explaining the method as disclosed by the present invention.

In known methods and devices of the above mentioned prior art type, the intensity of radiation passed by an analyzer rotating around an axis that is parallel to the direction of propagation of a radiation with a stationary state of polarization, or the intensity of radiation passed by a stationary analyzer, the polarization direction of said radiation being rotated by electrooptical or electromagnetic rotators, is evaluated as a function of the relative position between the polarization direction of the examined radiation and the axis of the analyzer. Compared therewith, the method in accordance with the present invention has the advantage that for determining the polarization direction only the modulation contrast, and for determining the ellipticity only the phase position of an interference fringe pattern produced in a predetermined manner has to be determined, e.g. by means of a self-scanning, one-dimensional photodiode arrangement (photodiode array), or by television means.

The periodic intensity distribution following the analyzer is fully described by three determining quantities which are associated in a simple manner to the characterizing parameters of elliptically polarized light. These parameters are the amplitudes of the components polarized vertically to each other, and their relative phases. If $A_y$ is the amplitude of the component polarized in y-direction its vector component shows in parallel to the axis of the analyzer the quantity $A_y \sin \beta$ if $\beta$ is the angle between both directions. Accordingly, the vector component of the component polarized in x-direction is $A_x \cos \beta$. Maximum or minimum intensities, respectively, are obtained when owing to the phase position the amplitudes are just being added or subtracted. It is similarly obvious that a phase difference as a function of the time between waves $A_y$ and $A_x$ is represented by a phase shift of the locally varying periodic intensity distribution. As the modulation contrast $$K = \frac{J_{max} - J_{min}}{J_{max} + J_{min}}$$

and $$J_{max} = (A_x + A_y)^2$$
$$J_{min} = (A_x - A_y)^2$$
$$J_{max} - J_{min} = 4 A_x A_y$$
$$J_{max} + J_{min} = 2 A_x^2 + 2 A_y^2$$

there applies $$K = \frac{2 A_x \cdot A_y}{A_x^2 + A_y^2}$$
$$= \frac{2 A_x / A_y}{A_x^2 / A_y^2 + 1} = \frac{2}{A_x / A_y + A_y / A_x}$$

which means that the ratio of amplitudes $A_x / A_y$, and consequently the polarization direction is clearly a function of the contrast.

One example of a structure for carrying out the method of the present invention includes a Wollaston prism, an analyzer and a photodiode array which can be arranged at a small distance from each other and therefore can be cemented or in any other way rigidly connected to each other the devices required for carrying out the method as disclosed by the invention are much smaller, less complicated and expensive, and much less susceptible to failure than all other known devices of the above mentioned type with a comparable measuring precision.

The device shown in FIG. 1 consists of a polarizing beam splitter 2, two reflecting surfaces 3 and 4 including an angle slightly differing from 90°, two λ/4 wafers 5 and 6, a one-dimensional photodiode array 7, and an analyzer 8 arranged between the polarizing beam splitter and the photodiode array, said analyzer passing light having a direction of polarization which halves the angle formed by the directions of polarization of the two radiation components impinging thereon.

The vertical on reflecting surface 3 includes a small angle ε with reflecting surface 4 so that the component reflected from surface 3 includes angle 2ε with the component reflected from surface 4 and beam splitter 2.

Since of the radiation components reflected or passed at beam splitter 2 and polarized vertically to each other analyzer 8 passes only the fraction that is polarized in the light passing direction, only a radiation that is fully capable of interference can reach photodiode array 7.

In FIG. 1, radiation 1 to be analyzed is linearly polarized in a direction including an angle of 45° with the drawing plane. Subsequently, on the correspondingly designed polarizing beam splitter 2 which can, for example, consist of a glass plate coated with several thin layers, 50% of the radiation in the direction of surface 3 are reflected while 50% of the radiation passes the beam splitter and reaches surface 4. As the radiation components reflected at surfaces 3 and 4 each pass λ/4 wafers 5 and 6 twice their respective direction of polarization is shifted by 90° so that the component reflected from surface 3 passes to 100% polarizing beam splitter 2 while the radiation component reflected from surface 4 is reflected to 100% at the polarizing beam splitter in the direction of photodiode array 7. As the reflecting surfaces 3 and 4 are not in vertical arrangement to each other which would cause a homogeneous brightness distribution on the surface of photodiode array 7, the optical path lengths of these components vary with a difference increasing from left to right so that a field of interference lines with maximum contrast is formed.

If there is a transition from the above specified ratio of 50:50% to ratios of 100:0% or 0:100% where the direction of polarization of impinging radiation 1 is turned either into the drawing plane or into the direction that is vertical to the drawing plane the modulation contrast which is a maximum in the 50:50% ratio decreases continuously and disappears completely when the ratios 100:0% or 0:100% are reached. As specified above it was found that there is a clear correlation between the position of the polarization plane of radiation 1 and the modulation contrast, as well as between the ellipticity of the radiation and the phase position of the interference fringe field in the area of photodiode array 7.

It is a known fact that if the radiation to be examined shows an elliptic polarization it can be assumed to be composed of two components linearly polarized in different directions and with different amplitudes, said components having different phase conditions since their combination forms a vector describing a helical line. Since according to classical physics this phase difference is a clear function of the ellipticity of radiation the phase position of the interference fringe pattern produced on photodiode array 7 will be a clear function of the ellipticity of the radiation to be analyzed. The electrical signal appearing during the analysis of a predetermined radiation at the outputs of the photodiode forming photodiode array 7 therefore receive a clear information via the polarization direction as well as the ellipticity of radiation 1 to be analyzed. These signals can be evaluated by means of analog or digital methods known per se.

The analog processing can be executed in a particularly simple manner since the modulation contrast and the phase position of the interference line pattern can be converted directly by processing the electric signals with simple circuits into direct voltages proportional to these values.

Figure 2:
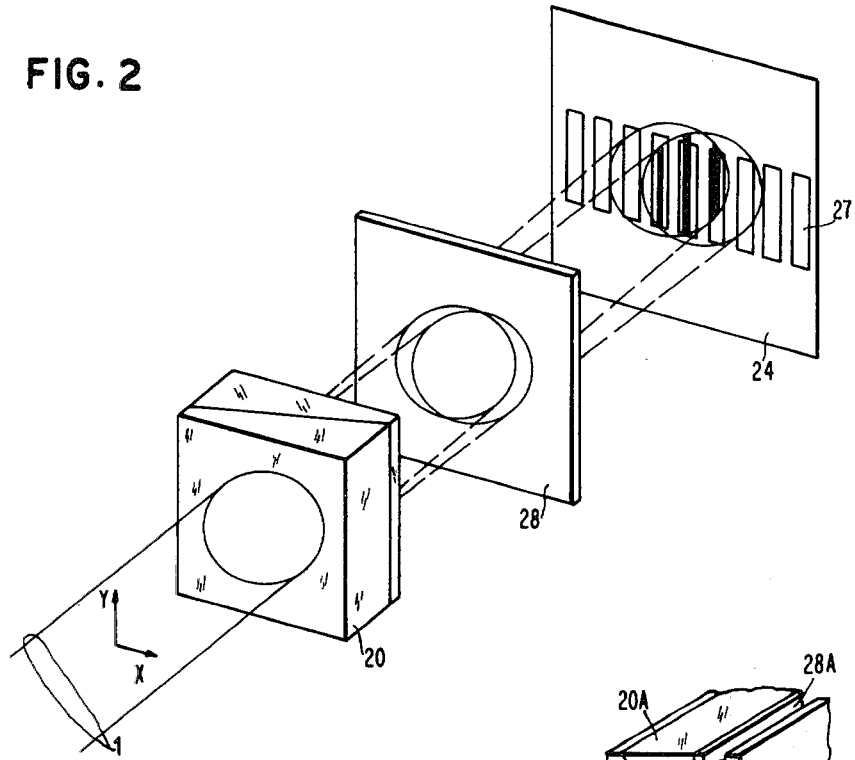
FIGS. 2 and 3 are schematic illustrations of further embodiments of the present invention.

The particularly advantageous embodiment of the invention shown in FIG. 2 consists of a Wollaston prism 20, an analyzer 28 and a photodiode array 27 arranged in an evaluation plane 24. Upon passing through Wollaston prism 20 a radiation 1 to be analyzed is split into two beams vertically linearly polarized to each other which includes a small angle and show a phase shift that is a function of the distance from the optical axis.

It is obvious that the difference of the phase positions of these two beams is a function of their distance from the left or right edge of Wollaston prism 20 and whose axis of polarization is inclined by e.g. 45° relative to the directions of polarization of the two vertically polarized beams produces a periodic intensity distribution when the impinging radiation is polarized at least partly and has a component in parallel to the axis of the analyzer. The periodicity of the intensity distribution which generally consists of an interference fringe pattern in evaluation plane 24 is proportional to the wave length of the light and inversely proportional to the sine of the splitting angle of the Wollaston prism.

The intensity distribution is detected by the one-dimensional photodiode array 27 arranged in plane 24, and subsequently applied either to suitable analog circuits or to a computer for evaluation. Photodiode array 27 is preferably designed as a "self-scanning photodiode array" since such devices are commercially available in many designs, inexpensive, not very susceptible to failures and easily evaluatable. Instead of the photodiode array a conventional television camera, a one-line television camera or a light detector equipped with an oscillating mirror can be used.

The periodic intensity distribution behind the analyzer is fully described by three determining factors. These three determining factors are the maximum amplitude, the minimum amplitude and the phase position of the intensity distribution. Instead of maximum and minimum amplitude, modulation contrast and mean value are equally possible. These determining factors are associated in a simple manner to the characterizing parameters of elliptically polarized light, i.e. to the amplitudes of the part waves vertically polarized to each other, and to their relative phase. If $A_y$ is the amplitude of the part wave polarized in y-direction its vector component shows parallel to the analyzer axis the amount of $A_y \sin \beta$, $\beta$ being the angle between the analyzer axis and the polarization direction of the part wave. Accordingly, the vector component of the part wave polarized in x-direction is $A_x \cos \beta$. Maximum and minimum intensity are reached when owing to this phase position these amplitudes are just being added or subtracted. It is similarly obvious that a phase difference as a function of the time between waves $A_y$ and $A_x$ is represented by a phase shift of the locally varying periodic intensity distribution.

Figure 3:
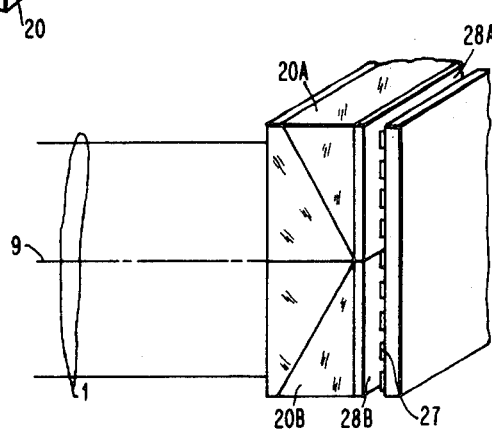

If measuring results are required which without interpretation and marginal conditions being considered permit clear statements on polarization direction and ellipticity it is possible to select a device which is obtained by adding a further detector additionally measuring the intensity in one of the polarization directions, instead of the above described device comprising only one Wollaston prism and one analyzer and not permitting a clear correlation of the measured amplitudes to the x-direction or y-direction as also known from the ellipsometer. Of particular advantage, however, is the device of FIG. 3 which consists of two Wollaston prisms 20A and 20B of opposite slope, and two analyzers 28A and 28B arranged behind them whose polarization axes, with the polarization axis of one representative of the linearly polarized components produced by both Wollaston prisms include angles of 30° or 60°, respectively or other angles preferably symmetrical to 45°. The analyzers are preferably cemented or otherwise joined to the Wollaston prisms and the following multidiode array into one single unit. The function of the device is concluded from the specifications of FIGS. 1 and 2. If due to a change of ellipticity there is in this device a phase shift in the incident beam over its entire cross-section the interference fringe patterns formed on photodiode array 27 move in opposite directions. However, if the direction of incidence in the splitting plane is changed the fringes shift in the same direction independently of changes of ellipticity. Phase position and direction of incidence can thus both be determined independently of each other. The splitting angle of the Wollaston prism is advisably selected in such a manner that both fringe systems comprises approximately 2 to 3 periods each. The envelopes of the maxima and minima can then be easily computed, or detected by any other analog method so that e.g. the influence of illumination can be compensated with a "Gauss-shaped" laser beam.

Compared with devices used in conventional ellipsometers for determining the state of polarization the adjustment of the above described device is very simple. The two Wollaston prisms 20A and 20B are adjusted for parallelity between crossed polarizers. The divided analyzers are aligned on an axis angle of 90° with respect to each other. Wollaston prisms and polarizers are subsequently illuminated e.g. with linearly polarized light, and adjusted if necessary under computer control. The direction of polarization of the illumination does not have to be known. Wollaston prisms, analyzers and photodiode array can be fixed after adjustment in a direct contact to each other, preferably by cementing. In this manner, the entire device can be housed in a volume of only a few cubic centimeters.

Thus having described our invention, what we claim as new, and desire to secure by Letters Patent is:

1. Apparatus for analyzing the state of polarization of radiation comprising:

a beam splitter in the path of said radiation, said beam splitter including first and second Wollaston prisms which are equal to each other and are arranged one beside the other and rotated by 180 degrees relative to each other, first and second analyzers provided behind said first and second Wollaston prisms with the axes of polarization of the two analyzers being arranged symmetrically about an angle of 45 degrees relative to the polarization of the light beams exiting from said Wollaston prisms, and a linear light detector arrangement provided behind said analyzers, said light detector including a photodiode array.

* * * * *